No. 664,934. Patented Jan. 1, 1901.
H. EDSON.
HAY LOADER.
(Application filed Mar. 14, 1898.)
(No Model.) 2 Sheets—Sheet 1.
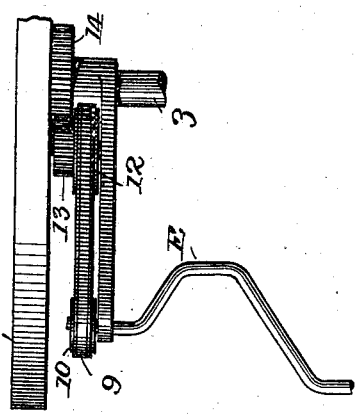
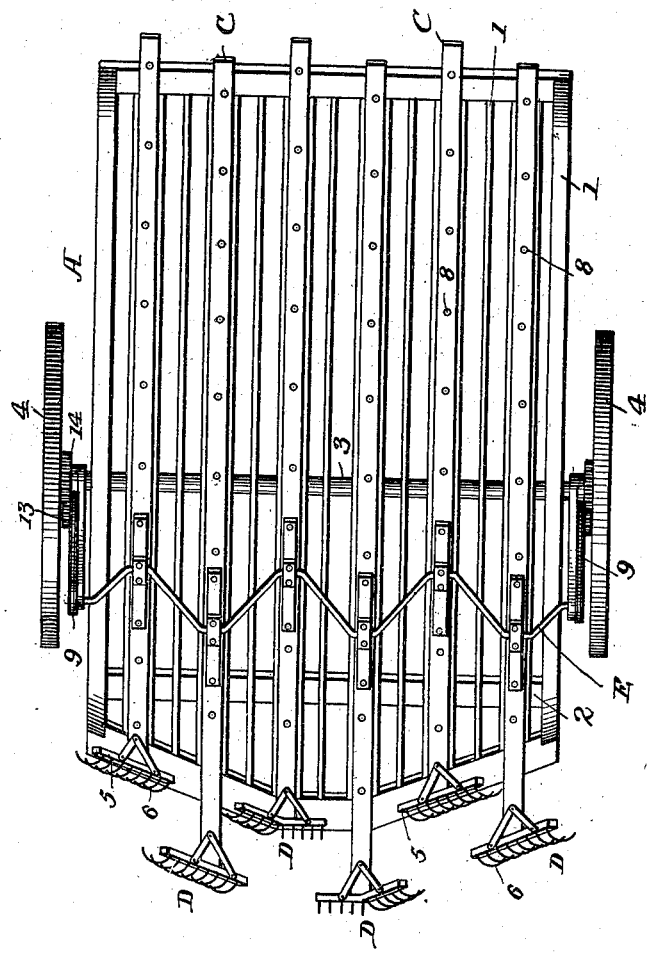
Witnesses
Inventor
Hubert Edson
Attorneys

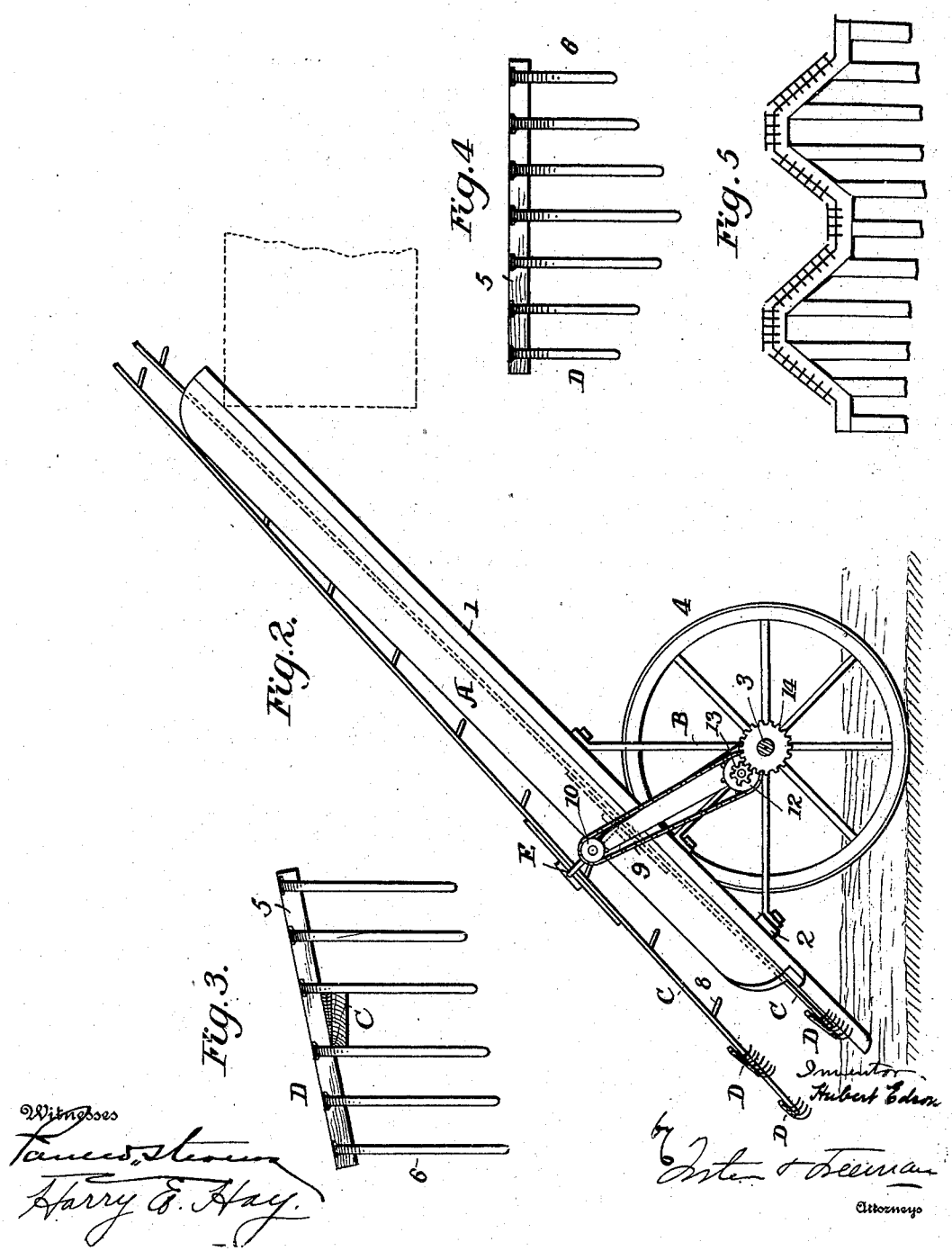

United States Patent Office.

HUBERT EDSON, OF PATTERSON, LOUISIANA.

HAY-LOADER.

SPECIFICATION forming part of Letters Patent No. 664,934, dated January 1, 1901.

Application filed March 14, 1898. Serial No. 673,831. (No model.)

*To all whom it may concern:*

Be it known that I, HUBERT EDSON, a citizen of the United States, residing at Patterson, parish of St. Mary, State of Louisiana, have invented certain new and useful Improvements in Hay-Loaders, of which the following is a specification.

This invention relates to certain new and useful improvements in hay, cane, and straw loaders adapted to be attached to the rear of a wagon-body or other receptacle and to gather the material from the ground and elevate it into the wagon-body; and the invention consists in the novel construction and arrangement of the parts hereinafter more particularly described.

In the accompanying drawings, forming a part of this specification, and in which like characters of reference indicate corresponding parts, Figure 1 is a top plan view of the invention. Fig. 2 is a side elevation thereof. Fig. 3 is a detail view of one of the rakes. Fig. 4 is a similar view of a modification, and Fig. 5 is a plan view illustrating a modified arrangement of platform end. Fig. 6 is a detail view of the reciprocating mechanism of the rake-bars.

Referring more particularly to the drawings, A designates the platform of the loader, which may be of any desired width and length and which is formed in the present instance of a series of longitudinal parallel separated bars 1 and transverse connecting-bars 2. This platform is supported near its rear end upon a suitable frame B, which is in turn pivotally connected upon the axle 3 of the supporting-wheels 4 in such manner as to permit the platform to be inclined to bring its rear end in contact with or in close proximity to the ground and its front end into position to be detachably connected to the top of a wagon-body, portable baling-press, or other suitable receiving-receptacle for the elevated material. (Not shown.)

In the cultivation of sugar-cane, corn, and other similar plants the earth is thrown up in parallel rows, from the centers of which the stalks of the plants extend, leaving furrows intermediate the rows, and on account of this undulating character of the ground it has heretofore been difficult to gather up and elevate that portion of the material which lies in the furrows between the rows of earth, for the reason that the platform which carries the elevating mechanism could not be brought close enough to the bottoms of the furrows, owing to the fact that the end of the platform extended at a right angle to its sides. Accordingly it is an object of this invention to overcome this difficulty by providing a platform and suitable elevating mechanism which may be brought into uniform proximity or contact with the surface from which the material is to be elevated, however undulating or uneven such surface may be. With this end in view I construct the lower end of the platform or that end which is in close proximity to the ground when the loader is in use in a manner to approximate the inequalities of the ground. This may be done in several ways; but, as shown in the drawings, the middle portion of the platform is extended or lengthened to a greater extent than its side portions, so that when the forward end of the platform is elevated, as shown in Fig. 2, the middle portion of its lower end will be lower than the side portions thereof and can move along in a furrow, while the portions at each side will move along the upwardly and outwardly inclining ridges on each side of the furrow, and thus the end of the platform throughout its width will be in substantially uniform proximity to the ground. This is the preferred construction, because when the cane is cut it generally lies across the depressions. It is obvious, however, that, if desired, the middle portion of the platform may be the shortest, in which event it would be over the middle of the ridge, while the longer side portions of the platform would work along the downwardly-inclined side of the ridge. These constructions are what might be adopted where the platform would be of a width equal to the distance between the medium lines of two adjacent ridges or furrows. In the event the platform is designed to be wide enough to extend fully over more than one ridge or furrow the end of the platform may be formed as in Fig. 5.

Obviously the rakes must be made to conform to the inequalities of the surface of the ground, as well as to the inequalities of the end of the platform, and, as shown in the drawings, the length of the rake-bars in the middle portion of the platform is greater than that of those on the side portions, it being necessary that in their extreme outward movement they shall be uniformly distant from the end of the platform. The rakes must also be so connected to the rake-bars as to conform to the inequalities of the ground, and this is best done by making the rake-heads 5 assume the proper angle relatively to the rake-bars, which latter all lie in the same planes, or substantially so, to conform to the surface over which it is to work. Thus the rakes to operate on the sides of the furrows may be oblique to the plane of the rake-bar, as shown in Fig. 3, while those working in the lowest part of the furrow may be partly parallel and partly oblique to the plane of the bar, as shown in Fig. 1; or, if preferred, the teeth 6 of the rake may be of different lengths, as in Fig. 4, which illustrates a rake designed for the middle of the furrow. However, I prefer to have the teeth of substantially uniform length and provide for the inclined arrangement either by properly shaping the heads or by securing such heads to the bars at an oblique angle thereto.

Different means may be employed for imparting a reciprocating movement to the rake-bars C; but preferably this is effected through the medium of a crank-shaft E, journaled in suitable bearings and extending transversely across the platform A, and to the cranks of said shaft the rake-bars C are suitably connected, the cranks being so arranged as to reciprocate the alternate rake-bars simultaneously in opposite directions and their throw being such as to bring the rakes D from their points of maximum rearward projection up to or upon the rear edge of the platform A to deposit the material collected upon the platform.

Any suitable means may be employed for elevating the material after it has been brought upon the lower edge of the platform, and, as shown, there are arranged longitudinally of the rake-bars C at regular intervals elevating-teeth 8, which project from the lower faces of said bars into position to engage with and elevate the material deposited upon the platform beneath the rake-bars by the rakes D. Upon the shaft of the sprocket-wheel 12 is a small pinion 13, which meshes with and is driven from a larger pinion 14, carried upon the supporting-wheel.

Motion is imparted to the crank-shaft E from the supporting-wheels 4 through a sprocket-chain 9, which passes around sprocket-wheels 10 12, mounted upon the crank-shaft and frame, respectively.

Without limiting myself to the exact construction and arrangement of the parts shown and described, since it will be understood that various changes may be made therein without departing from the spirit of my invention,

What I claim is—

1. A hay-loader having a platform the lower end of which extends to uneven distances to correspond to depressions and elevations of the ground when the loader is in operation, substantially as set forth.

2. In a hay-loader, a platform whose side and middle portions extend uneven distances at its lower end, combined with reciprocating rakes arranged to work to uniform distances from the said end of the platform, substantially as set forth.

3. A hay-loader having a platform whose lower end extends to uneven distances to correspond to depressions and elevations of the ground, and a series of reciprocating rakes to deposit material on the lower end of the platform, the said rakes being also arranged to conform to irregularities in the surface of the ground, substantially as set forth.

4. A hay-loader having a platform whose lower end extends to uneven distances to conform to the uneven surface of the ground, a series of rakes arranged to work to uniform distances from the lower end of the platform and also to conform to the uneven surface of the ground, and means to reciprocate the rakes uniformly, substantially as set forth.

In testimony whereof I have signed my name to this specification in the presence of two subscribing witnesses.

HUBERT EDSON.

Witnesses:
ARTHUR TARBY,
L. W. HEINSZ.